(12) United States Patent
Dowdell

(10) Patent No.: US 9,577,963 B2
(45) Date of Patent: Feb. 21, 2017

(54) APPLICATION FOR AUGMENTING A MESSAGE WITH EMOTIONAL CONTENT

(71) Applicant: Stefan Dowdell, Atlanta, GA (US)

(72) Inventor: Stefan Dowdell, Atlanta, GA (US)

( * ) Notice: Subject to any disclaimer, the term of this patent is extended or adjusted under 35 U.S.C. 154(b) by 57 days.

(21) Appl. No.: 14/222,229

(22) Filed: Mar. 21, 2014

(65) Prior Publication Data

US 2015/0271111 A1    Sep. 24, 2015

(51) Int. Cl.
| | |
|---|---|
| G06F 15/16 | (2006.01) |
| G06Q 30/02 | (2012.01) |
| H04L 12/58 | (2006.01) |
| G06Q 50/00 | (2012.01) |
| H04L 29/08 | (2006.01) |

(52) U.S. Cl.
CPC ............ *H04L 51/02* (2013.01); *H04L 51/063* (2013.01); *G06Q 30/0277* (2013.01); *G06Q 30/0282* (2013.01); *G06Q 50/01* (2013.01); *H04L 67/306* (2013.01)

(58) Field of Classification Search
CPC . G06F 17/2785; G06Q 50/01; G06W 30/0282
See application file for complete search history.

(56) References Cited

U.S. PATENT DOCUMENTS

| | | | | |
|---|---|---|---|---|
| 8,331,539 B2* | 12/2012 | Eckel | ...................... | H04M 1/57 379/67.1 |
| 8,688,796 B1* | 4/2014 | Lavian | .................. | H04L 67/306 705/14.44 |
| 2006/0161631 A1* | 7/2006 | Lira | ...................... | G06F 17/214 709/206 |
| 2009/0110246 A1* | 4/2009 | Olsson | .............. | H04M 1/72544 382/118 |
| 2011/0055675 A1* | 3/2011 | Sakai | ..................... | G06F 17/241 715/200 |
| 2011/0300884 A1* | 12/2011 | Ollila | ..................... | G06F 3/0237 455/466 |
| 2012/0317593 A1* | 12/2012 | Myslinski | .............. | G06Q 10/10 725/14 |
| 2014/0157153 A1* | 6/2014 | Yuen | ..................... | A63F 13/795 715/758 |
| 2014/0236596 A1* | 8/2014 | Martinez | ............. | G06F 17/2785 704/235 |

(Continued)

*Primary Examiner* — Nicholas Taylor
*Assistant Examiner* — Ho Shiu
(74) *Attorney, Agent, or Firm* — Incorporating Innovation LLC; Charlena Thorpe, Esq.

(57) ABSTRACT

Implementations of this disclosure may assist users to communicate more effectively in online communications over a network such as emails, instant messaging, text messages, and social networking messages. In some implementations, systems and methods of this disclosure enable a message composer to augment a first message with one or more predefined or custom second messages where the second message is intended to convey an unspoken meaning about the first message. In some implementations, systems and methods of this disclosure enable a recipient of the augmented first message to rate the first message on its genuineness and to provide a predefined or custom explanation of the recipient's rating. In some implementations, systems and methods of this disclosure can change an online users' online picture (e.g., profile picture, avatar, etc.) based on ratings of the user's messages by recipients.

2 Claims, 6 Drawing Sheets

(56) References Cited

U.S. PATENT DOCUMENTS

| | | | | |
|---|---|---|---|---|
| 2014/0324605 A1* | 10/2014 | Steelberg | ........... | G06Q 30/0277 705/14.73 |
| 2015/0067878 A1* | 3/2015 | Steelberg | ................ | G06F 21/10 726/26 |
| 2015/0262238 A1* | 9/2015 | Aitchison | .......... | G06Q 30/0263 705/14.6 |

* cited by examiner

APPLICATION FOR AUGMENTING A MESSAGE WITH EMOTIONAL CONTENT

TECHNICAL FIELD

This disclosure relates to implementations of an application for augmenting a message with emotional content.

BACKGROUND

Society relies more and more on written communication via such communications means as emails, instant messaging, text messages, and social networking messages than on other traditional forms of oral communications using landline and wireless phones. However, these written communications means can be detrimental to communicating genuinely. For example, through such social network measurements as number of friends and number of likes of a comment, social media tends to encourage and reward the quantity of communication and not the quality of communication. As another example, site guidelines and like/dislike voting, among other things, can influence a person to communicate in a way that garners the most support or positive feedback from the individual's social network. As yet another example, feedback using these written communication means can often be vague with one-word responses or a simple like/dislike indicator. Finally, although emoticons have been used to attempt to express emotion in writings, emoticons lack range and can be used to perpetuate communication that is not genuine.

DETAILED DESCRIPTION

Implementations of this disclosure may assist users to communicate more effectively in online communications over a network such as emails, instant messaging, text messages, and social networking messages. In some implementations, systems and methods of this disclosure enable a message composer to augment a first message with one or more predefined or custom second messages where the second message is intended to convey an unspoken meaning about the first message. In some implementations, systems and methods of this disclosure enable a message composer to augment a first message by highlighting one or more words in the first message and assign one or more predefined or custom words conveying feeling or intent or other clarifying words to the highlighted words. In some implementations, systems and methods of this disclosure enable a recipient of the augmented first message to rate the first message on its genuineness and to provide a predefined or custom explanation of the recipient's rating. In some implementations, systems and methods of this disclosure can change an online users' online picture (e.g., profile picture, avatar, etc.) based on ratings of the user's messages by recipients. In some implementations, distortion of the user's picture is proportional to the genuineness rating of the user's messages. For example, the more genuine the user's messages are rated, the less distorted is the user's picture; the less genuine the user's messages are rated, the more distorted is the user's picture. In this way, the genuineness rating of a user can be determined based on viewing the user's picture.

Figure 1:
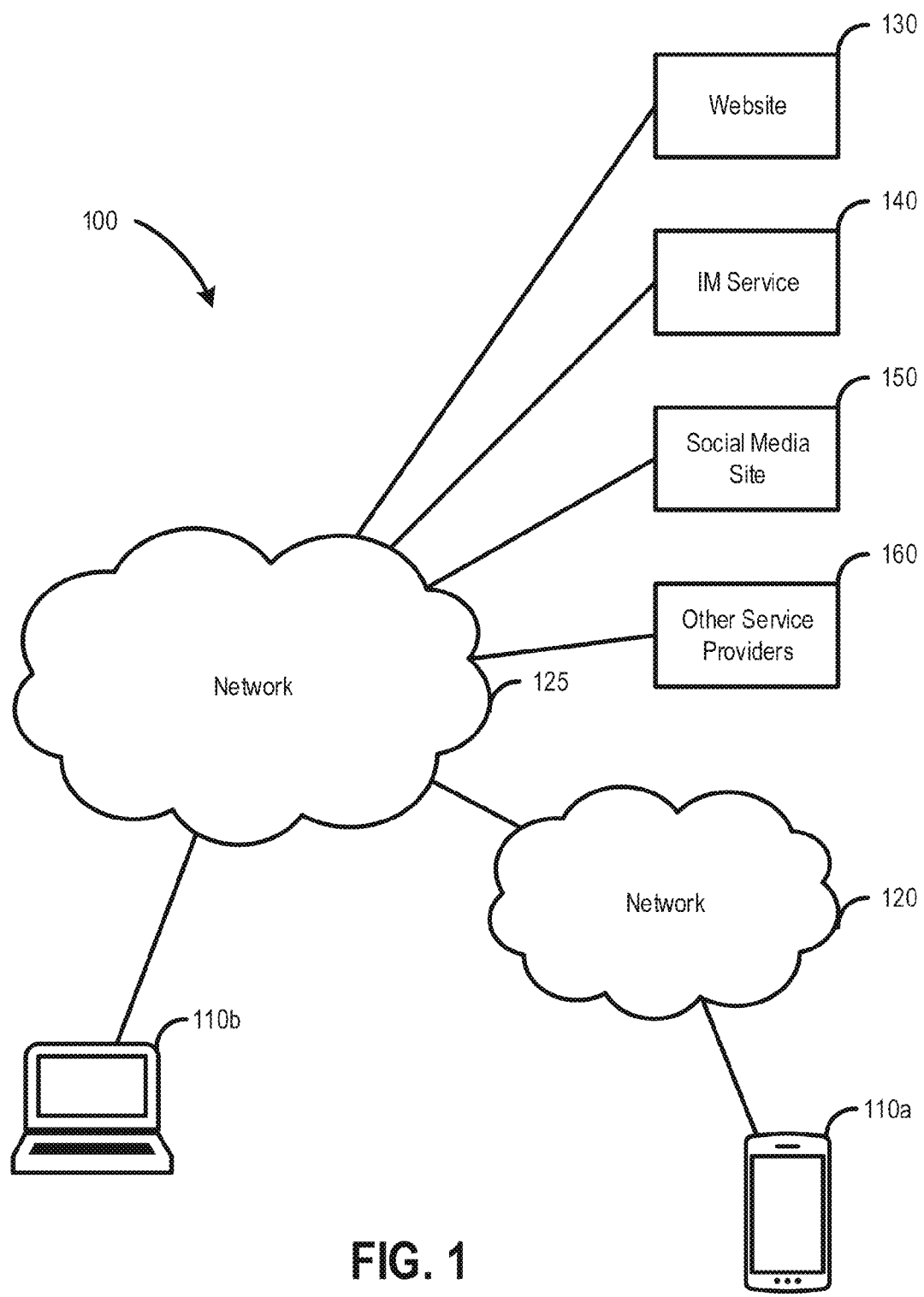
FIG. 1 illustrates an example messaging environment of the present disclosure for posting and sending messages.

FIG. 1 illustrates an example messaging environment 100 of the present disclosure for posting and sending messages. Messages can be in any electronic message format such as electronic mail ("email") messages, chat messages, comments left on a user's webpage, and short message service (SMS) text messages. In some implementations, messages can contain plain text or other content such as pictures, videos, and attachments.

As shown in FIG. 1, the messaging environment 100 can include client devices 110a and 110b (collectively client device 110), a wireless cellular network 120, network 125, a website 130, an instant message (IM) service 140, a social media site 150, and other services providers 160. Client devices 110a and 110b are depicted as a mobile phone 110a and desktop computer 110b, respectively, but client devices 110 may comprise any type of computing device, including mobile phone, laptop, netbook tablet, cable box, television, wearable computing (e.g., Google Glass), etc.

The client device 110a connects to network 125 through a wireless cellular network 120, such as GPRS-based and CDMA-based wireless networks, as well as 802.16 WiMax and long-range wireless data networks. The client devices 110a and 110b have memories (e.g., offline storage 170) capable of storing text and other messaging data.

Client devices 110a and 110b interact with external websites (e.g., website 130) and other service providers 140, 150, and 160 via an application, such as a web browser or a native application, residing on the client devices 110a and 110b to post and send messages. For example, client devices 110a and 110b may interact with an instant messaging service (e.g., IM service 140), such as Google Chat, by visiting and logging into their Gmail account via a web browser, or by installing and running a dedicated Google Talk application. Similarly, client devices 110a and 110b may interact with a social media site, such as Twitter, via a browser or through a dedicated Twitter application. Other service providers 160 may include, but is not limited to, e-mail servers, other social-networking websites, shopping sites, review sites, and any third-party website on which a user maintains an account to interact with content or other users. This disclosure contemplates any type of service provider 160 connected to network 125.

Client device 110a, connected through wireless network 120, may also interact with other client devices through the circuit-switched, or non-data, portion of wireless network 120. For example, a user at client device 110a may transmit and receive a non-VoIP call to a cellular phone or landline, transmit and receive a text or multi-media message through the SMS or MMS channels, or receive push notifications through the SMS control channel.

In implementations of the present disclosure, applications (e.g., server and/or client applications) used to post and send messages to external websites (e.g., website 130), other service providers 140, 150, and 160, and other client devices (e.g., 110a) are configured such that a message composer can augment a main, first message with one or more predefined or custom second messages where the second message is intended to convey an unspoken meaning about the first message.

Figure 2:
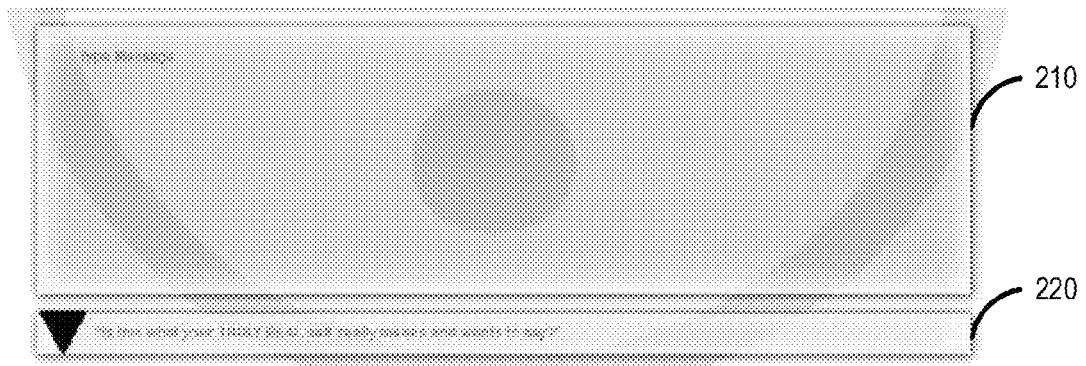
FIG. 2 illustrates an example user interface for posting or sending a message.

FIG. 2 illustrates an example user interface 200 for posting or sending a message. The user interface 200 can be, for example, a webpage that is viewed by a user with a web browser. The interactive user interface 200 may be an application residing on the user's computing device 110a or 110b. In some implementations, the interactive user interface 200 may be a combination of server and client side rendering, depending on processing and bandwidth capacity. As shown in FIG. 2, in some implementations, the user interface includes a location 210 to enter a main, first message and a drop down menu 220 to select one or more predefined second messages intended to convey an unspoken meaning about the first message. In some implementations, the interface includes a location to enter a custom second message intended to convey an unspoken meaning about the first message.

In some implementations, the main, first message can include text, video, or an image or combination of the foregoing. In some implementations, the predefined, second messages may be intended to answer one or more of the following questions: "Is this your meaning what you say; saying what you really want to without any fake action; how you truly feel, and being completely true and real with yourself and others?" In some implementations, the predefined, second messages intended to answer the posed question generally may be a statement confirming that the main message is genuine, a statement that the message composer is having a hard time saying what the composer would like to say, a statement regarding an underlying emotion of the composer, or some other statement that provide additional meaning about the main message.

For example, predefined, second messages confirming that the main message is genuine may include: "I truly mean it; you can take it word for word. But, ask me to make sure the meaning you got is the meaning I intend"; "This is the real me; being completely true with you and myself"; "These are my truly real feelings; some of this may unintentionally hurt at first but I will not waste moments of your life and mine by being fake"; "These are my real thoughts; but I am unsure, so don't expect me to feel this way forever. I must take into account what I may not know"; and "This is my truly real current opinion and it does not realflect the views of my family, friends, employer, or those I am accountable for."

Predefined, second messages indicating that message composer is having a hard time saying what the composer would like to say include: "Kind of . . . sort of . . . ask me more . . . "; "I want to say what I really think/something more but your reaction . . . "; "I want to tell you so much more than what you see . . . I just don't know how"; "To not lead you on my final answer is no"; and "I told you this lie and I kept it going . . . this is me owning up to it, starting the process to right it with you, and just trying to get free so I can improve."

Other predefined, second messages that provide additional meaning about the main message can include statements that get to the point (e.g., "Let's have a serious talk . . . it's important"; "This is a definite YES"; "Do not take any of this seriously"; "I am only taking this position for argument's sake"; and "Posted only to share what I found (interesting, funny, informative, sad, shocking, sickening, heartwarming, write own)").

In some implementations of the present disclosure, applications (e.g., server and/or client applications) used to post and send messages to external websites (e.g., website 130), other service providers 140, 150, and 160, and other client devices (e.g., 110a) are configured such that a message composer can augment a main, first message by highlighting one or more words in the main, first message and assign one or more predefined or custom words conveying feeling or intent or other clarifying words to the highlighted words. For example, the predefined words can include: happy; sarcasm; worried; annoyed; joke; important; great emphases; love; between the lines; humbly; deep regret; unsure; opinion; or compliment.

In some implementations of the present disclosure, applications (e.g., server and/or client applications) used to review, rate, and respond to messages from external websites (e.g., website 130), other service providers 140, 150, and 160, and other client devices (e.g., 110a) are configured such that a recipient of a message (e.g., the first message, the second message, an augmented message, or a combination of the foregoing) may rate the message on its genuineness. In some implementations, the recipient can provide a predefined or custom explanation of the recipient's rating.

Figure 3:
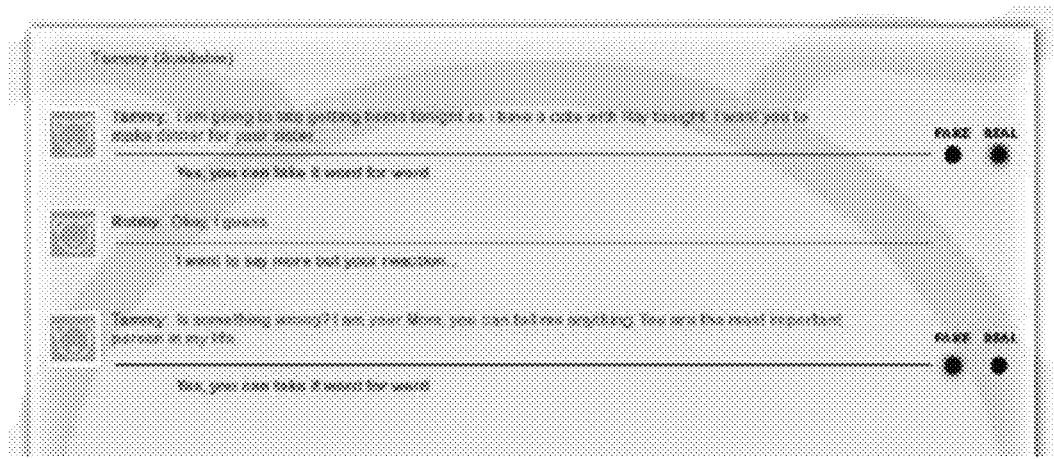
FIG. 3 illustrates an example user interface for rating a message.

FIG. 3 illustrates an example user interface 300 for rating a message. As shown in FIG. 3, in some implementations, a recipient can rate a message as real or fake. In some implementations, if the recipient rates the message as fake, the recipient may be presented with a drop-down menu of predefined reasons for why the recipient rated the message as fake.

For example, the predefined reasons may include or may be characterized as one of the following: hating, part-of-the-truth/half-truth, trolling, prepared statement/politically vague/pc, politically corrector/suppressor/censoring, not owning up, not listening, flaw focused, societal flaw/social ignorance/bigotry/social ills, ego, holding back, distorting/framing, posing, multi-deceptive, humor killing, lacking substance, over-judging, social assuming, rushing forgiveness/manipulative unforgiveness, bad argument, bias and lack of empathy, disrespect of privacy, action not louder than words, energy draining constant negativity, and double standard hypocrisy.

In some implementations, hating can mean unnecessary and unconstructive negativity or patronizing, often with a weak basis/reasoning for the hate, toward a person who is experiencing a moment of success or attention. In some implementations, hating can mean put down speech that tries to belittle or limit a person thinking, existence, dreams, or opportunity instead of helping or not being a hindrance if it is ethical.

In some implementations, part-of-the-truth/half-truth can mean more of a not-tell than an outright lie; a lie of omission. In some implementations, part-of-the-truth/half-truth can mean an answer that dodges answering the explicit question through facts, rationalizing, or issue changing that misdirects and allows the person to reply somewhat truthfully but not completely truthfully. In some implementations, part-of-the-truth/half-truth can mean a statement that leaves out details that could change a person's thinking/conclusion if originally told. In some implementations, part-of-the-truth/half-truth can mean truth that uses true facts but deceives by not attempting to consider the whole relevant picture or allow input of facts that may hurt the argument.

In some implementations, trolling means disrespectful behavior that is meant to deliberately anger or frustrate someone else in order to provoke an aggressive, over reactive, or embarrassing response.

In some implementations, prepared statement/politically vague/pc means politically correct vagueness and posturing of position.

In some implementations, prepared statement/politically vague/pc means safe or ambiguous politically correct statements that hide real meaning or gloss over an issue. In some implementations, prepared statement/politically vague/pc means double speak that mixes sense and nonsense in an effort to confuse meaning. In some implementations, prepared statement/politically vague/pc means prepared statements that lack the feeling of sincerity because the words, emotions, situational context, and meaning conveyed contradict with reality.

In some implementations, politically corrector/suppressor/censoring means trying to censor a person from being truly honest about uncomfortable, hard, sensitive, controversial and/or taboo subjects, beliefs, feelings, or opinions by prejudging (judging before you try above your best to truly understand the person and not judging the merit of your own thinking) and moving the discussion from personal or topic understanding to a malicious or unfair personal attack. In some implementations, politically corrector/suppressor/censoring means using, "it was the right thing to say" to allow obvious pc statements or the "didn't say it right/should have said" mindset to dismiss things that are said the "wrong" way but are respectful and have relevant or hard/ignored/neglected truth meaning.

In some implementations, not owning up means not taking responsibility for your actions and words. In some implementations, not owning up means excuses that try to justify irresponsible happenings/things you have sole control over or excuses that take advantage of opportune happening to deflect your accountability. In some implementations, not owning up means action-less apologies that don't show evidence of a positive action to try and prevent the wrong from happening again.

In some implementations, not listening means not openingly listening and fully hearing out responses from those who treat you with respect. In some implementations, not listening means only paying attention to the parts you want, twisting its meaning, and ignoring important details.

In some implementations, flaw focused means heavily and unnecessarily criticize a person's minor (things with very low consequence) actions, mistakes, and flaws instead of being real about no one being perfect. In some implementations, flaw focused means chastising negativity that points out flaws but ignores the negative aspects of the situation someone maybe in and belittles any good done by the person in the situation. In some implementations, flaw focused means over scrutinizing gossip which picks at a person's no harm causing actions or body for entertainment In some implementations, societal flaw/social ignorance/bigotry/social ills means racism (non-advancing discussion type, masked, obnoxious), bullying, threats, sexism (non-advancing discussion type, masked, obnoxious), prejudice, or stereotyping. In some implementations, societal flaw social ignorance/bigotry/social ills means falsely accusing or accusing without strongly real evidence (evidence based on directly related events, reasonable indirectly related events, or direct words from the accused person or those directly involved is acceptable to bring up in conversation). In some implementations, societal flaw social ignorance/bigotry/social ills means chastising the person who brought up the accusation with evidence to support it before trying to see if the accusation is true, false, or grey. In some implementations, societal flaw/social ignorance/bigotry/social ills means Ignoring social ills and bigotry when it happens.

In some implementations, a pop up note may appear before the recipient may select the "societal flaw/social ignorance/bigotry/social ills" reason for why the recipient rated the message as fake. The pop up note may instruct the recipient not to select this reason during any advancing discussion on race or sex. An advancing/progressive discussion advances understanding of racial or sexist topics. It lets someone learn something or help someone understand. These are touchy subjects that must be brought up and worked through instead of being suppressed or delayed.

In some implementations, ego means holding on to an ego that gets in the way while trying to have a meaningful conversation. In some implementations, ego means dismissive or belittling of views unlike own. In some implementations, ego means constantly changing story or small parts of the story to try and avoid looking wrong. In some implementations, ego means letting preconceptions on certain subject cloud you willingness to explore or hear opinions that counter or question them.

In some implementations, holding back means keeping quiet on real thoughts and feelings due to fake allowing inhibiting pressures (negative peer pressure, possible embarrassment, awkwardness, conforming to fake behavior, or internal conflict (ex. it hurts to stop being fake)) that keep you from expressing your real and true self without any fake actions (learned, willful, or forced). In some implementations, holding back means putting on a front, masking real feelings, and not opening up to those that genuinely care for you and have proven through past actions to be there for you through ups and downs. In some implementations, holding back means trying to save the put-on perception that you think people want or have of you at the expense of those that have proven to truly care for you and your own real individuality. In some implementations, holding back means being fake to please and appease those that use you or abuse your genuine kindness. In some implementations, holding back means holding back anything in conversation at the expense of not being your real unlocked self without any worry to offending. In some implementation, if the recipient selects the "societal flaw /social ignorance/bigotry/social ills" reason for why the recipient rated the message as fake because they felt the composer "held back anything in conversation at the expense of not being your real unlocked self without any worry to offending", the recipient grant the composer's next statement immunity from offending the recipient and takes responsibility for anything the statement may contain. The recipient should treat the composer's next statement as confidential and never hold it against them or bring it up.

In some implementations, distorting/framing means shaping information to fit your claims and taking it out of relevant/important context. In some implementations, distorting/framing means adding exaggeration to serious (or that which can turn serious) stories and rumors without stating you are exaggerating or giving a strong clear hint to exaggeration. In some implementations, distorting/framing means stating contents in opinions, rumors, or conjecture like true facts even when unsure. In some implementations, distorting/framing means deliberately omitting known contradictory info or details. In some implementations, distorting/framing means misquoting another by leaving out the exact words and putting in your own interpretation.

In some implementations, posing means trying to almost force gather attention your way by grossly exaggerating who you are or what you represent and expecting others to have to accept it or pay attention to it (especially, while invading the space of another). In some implementations, posing means oversharing of only moments that make you look best or only sharing constant negativity. In some implementations, posing means fronting on friends and trusted associates as if they are not known or don't matter in front of others.

In some implementations, multi-deceptive means deceptively vague, spinster, two-faced actions, lying, no specific answer, hiding behind actions of others, deceptive impersonating, passive aggressive actions that hinder another, twisting words, or behind the back negativity. In some implementations, multi-deceptive means manipulative under a guise of kindness, righteousness, fragility, being honest, or being realistic by using these masks to try and deflect accountability of words and actions. In some implementations, multi-deceptive means stories (of true beliefs) are inconsistent, send mixed messages, and don't add up with actions In some implementations, humor killing means taking light, inside, or context of experience dependent humor which has been made obvious not to be serious too seriously and killing the moment. In some implementations, humor killing means killing humor based truthfully on unspoken harsh reality that brings social awareness. In some implementations, humor killing means killing or confusing people's sense of humor with bad feeling humor that is at the unconsented expense of/harms another In some implementations, lacking substance means meaningless and shallow talk that lacks any sort of relevant contribution to a conversation that is serious. In some implementations, lacking substance means yes man and group think feeling answers that support while ignoring the merit of what and why something is supported.

In some implementations, over-judging means prejudging a person's total being on the first negative/bad impression/action seen as if it is a conclusion to who the person really is and not treating the person like they are worth giving a chance to be him/herself in order to prove content of character. In some implementations, over-judging means judging a person's total being on overly negative possibilities, hearsay, differences, preconceptions, or generalizations (labels) as an opportunity to justify prejudice or bias views; or as an excuse to treating a person unjustly and not having to truly try and get to know the individual. In some implementations, over-judging means judging the heart (soul) of a person (instead of only the action that directly or significantly indirectly affects you or harms someone else) through a false divination sense of entitlement.

In some implementations, social assuming means to suppose someone will do, act, or think a certain way without actually asking or telling the person. In some implementations, social assuming means to assume or presume you know exactly how someone feels or that you know a person life better than the person who lives it (especially in racial context)(ask and compare but dismiss nothing real). In some implementations, social assuming means thinking you are being judged when someone respectfully disagrees. In some implementations, social assuming means taking the word of one person or a leader/voice of a group as if it is the assumed view of everyone in the group and neglecting individual versatility and ranges of thinking. In some implementations, social assuming means assuming a person in a position of power is correct and unquestionable or that a statement that appears in something popular or official is true.

In some implementations, rushing forgiveness/manipulative unforgiveness means trying to rush a person to forgive someone by any action other than giving the person the time needed (especially if the action was not own up to and made up for). In some implementations, rushing forgiveness/manipulative unforgiveness means using unforgiveness as an opportunity to manipulate the person who has done wrong by holding them captive by their past wrong in ways that bar their freedom to own up to the action, truly try and make up for it, move on from the mistake, and live life while trying to change.

In some implementations, bad argument means argument that attacks the tone of the message or the perceived personal characteristics of the writer/person instead of taking the time to deal with the substance of what was originally said. In some implementations, bad argument means name calling when you disagree or can't get your point across. In some implementations, bad argument means aiming your counterargument at something different than the original argument in an effort to move away from a possible losing debate and in effect abruptly change the subject which gets the conversation off track. In some implementations, bad argument means only answering the meaning you think a statement or question has instead of answering the actual meaning given by the specific words used if the question is real, relevant, and not baiting for malicious embarrassment.

In some implementations, bias and lack of empathy means bias responses and resulting actions that show a lack of willingness to even try seeing things from the perspective of another person who is respectful.

In some implementations, disrespect of privacy means disrespectful of the privacy of another person when it comes to things that are personal business to that person that does not harm (or has the potential to harm) another person. In some implementations, disrespect of privacy means sharing of anything (no matter how small you think it is) of a friend's that you do not have consent from that friend to share.

In some implementations, action not louder than words means empty promises and claims that in the moment of opportunity to prove they were true were only shown to be words and no action.

In some implementations, energy draining constant negativity means seemingly constant negativity during a majority of recent conversations that is draining to have to constantly listen to (especially, but not only, when the negativity is about things the complaining person has the power to change but chooses to not even attempt).

In some implementations, double standard hypocrisy means situation where a double standard that ignores injustice is accepted as normal and okay because a group or person would experience loss of unfair power or freedom from not having to be held accountable while the other person or group is held back or ridiculed because them experiencing the same advantage is "culturally uncomfortable".

In some implementations of the present disclosure, applications used to display an online user's online picture (e.g., profile picture, avatar, etc.) can be configured to change the user's picture based on ratings of the user's messages by recipients. In some implementations, a native application, residing on the client device is used to capture an upload an image of the user. In this way, the true identity of a user can be more likely verified.

In some implementations, distortion of the user's picture is proportional to the genuineness rating of the user's messages. For example, the more genuine the user's messages are rated, the less distorted is the user's picture; the less genuine the user's messages are rated, the more distorted is the user's picture. In this way, the genuineness rating of a user can be determined based on viewing the user's picture.

Figure 4:
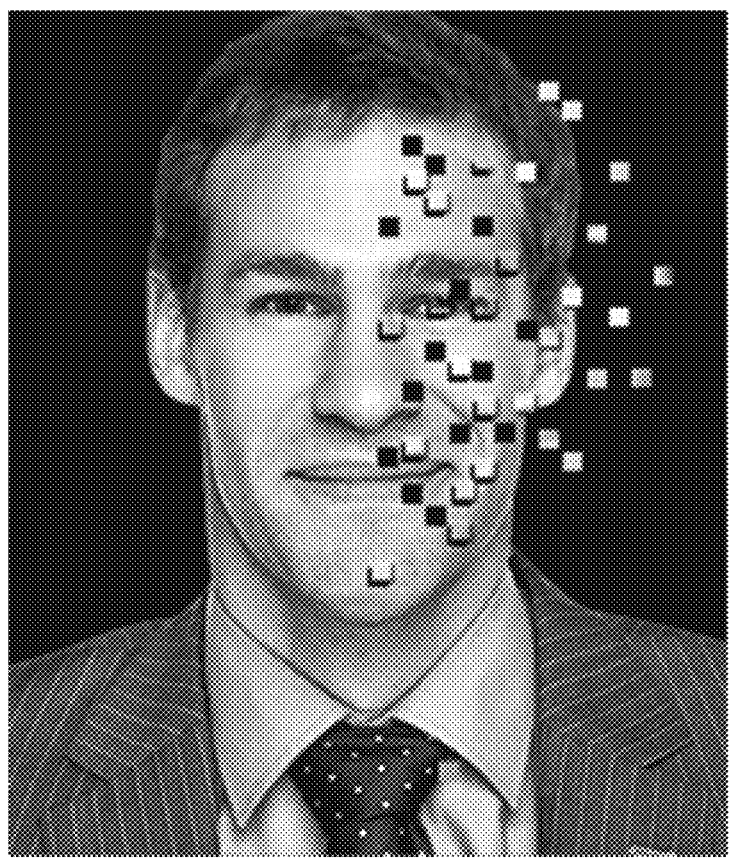
FIG. 4 illustrates an example user online picture that has become distorted based on the user's genuineness rating.

FIG. 4 illustrates an example user online picture that has become distorted based on the user's genuineness rating. For example, one or more pixels or groups of pixels of a user's online picture may become displaced when a user's message is rated "fake". As another example, one or more displaced pixels of a user's online picture may be restored when a user's message is rated "real". In some implementations, groups of pixels representing of a visible piece of the user's online picture may become displaced when a predefined number of the user's message is rated "fake". Any algorithm can be used to change the user's picture based on ratings of the user's messages by recipients.

While the foregoing embodiments may be implemented in a variety of network configurations, the following illustrates an example network environment for didactic, and not limiting, purposes.

Figure 5:
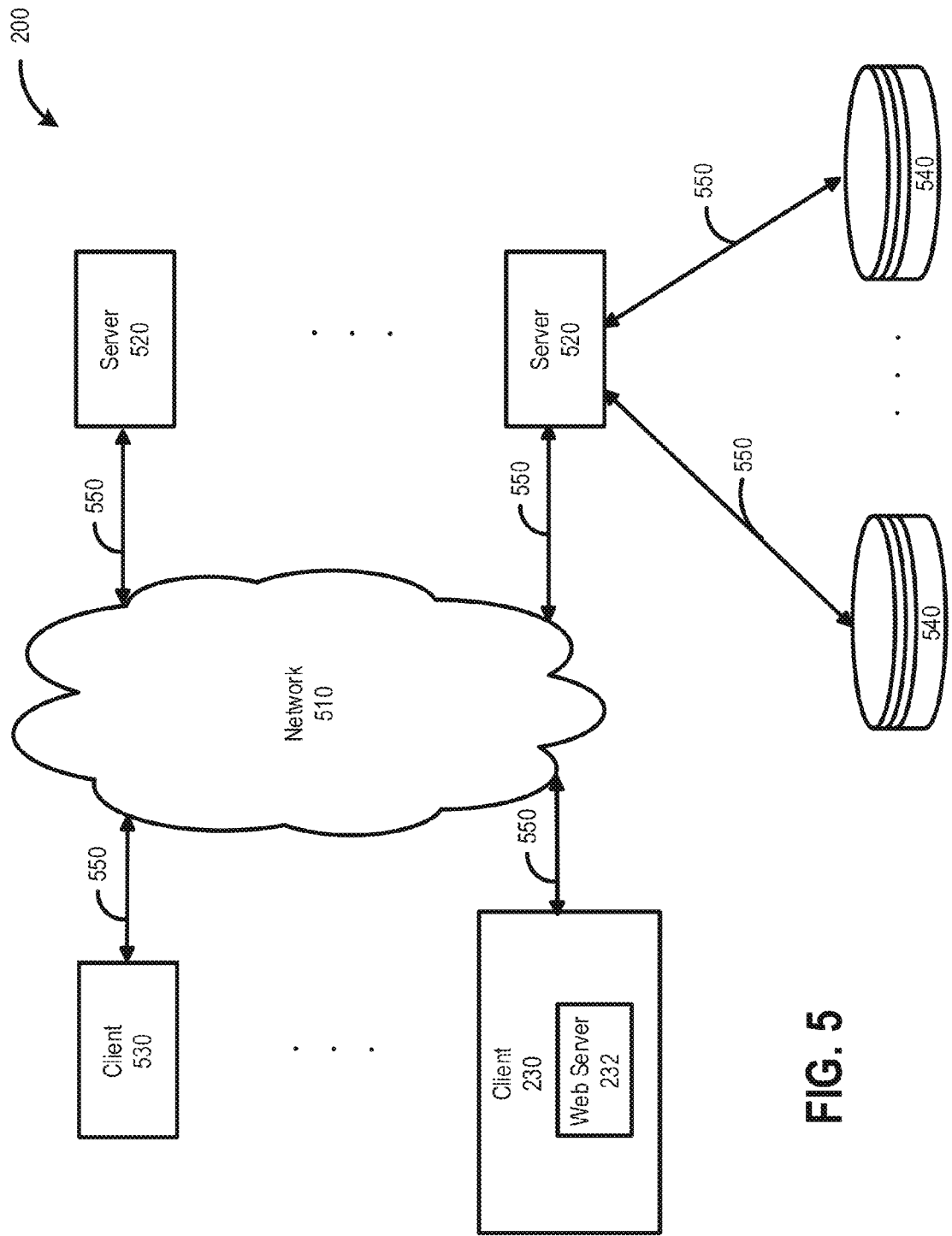
FIG. 5 illustrates an example network environment.

FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, applications used to render the user interfaces to perform the functions described above may be written in software programs hosted by one or more servers 520. In some implementations, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In some implementations, one or more links 550 each includes one or more wired, wireless, or optical links 550. In some implementations, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In some implementations, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In some implementations, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In some implementations, one or more data storages 540 may be communicatively linked to one or more servers 520 via one or more links 550. In some implementations, data storages 540 may be used to store various types of information. In some implementations, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In some implementations, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
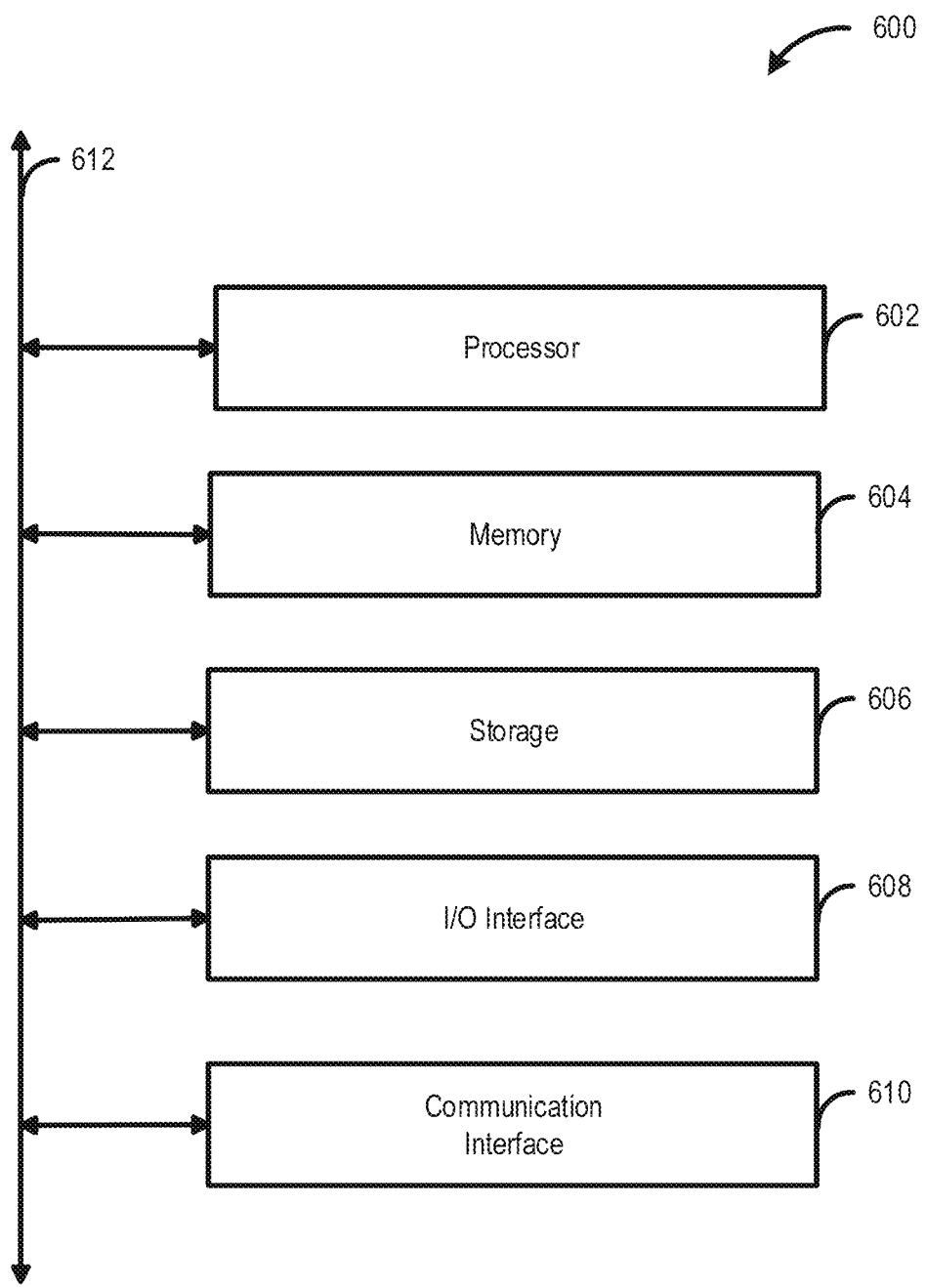
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In some implementations, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In some implementations, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In some implementations, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In some implementations, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In some implementations, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In some implementations, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In some implementations, one or more memory management units (MMUs) reside between processor 602 and memory 604 and facilitate accesses to memory 604 requested by processor 602. In some implementations, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 602, where appropriate. Although this disclosure describes and illustrates particular memory, this disclosure contemplates any suitable memory.

In some implementations, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In some implementations, storage 606 is non-volatile, solid-state memory. In some implementations, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In some implementations, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface

608 may include one or more I/O interfaces 608, where appropriate. Although this disclosure describes and illustrates a particular I/O interface, this disclosure contemplates any suitable I/O interface.

In some implementations, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In some implementations, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
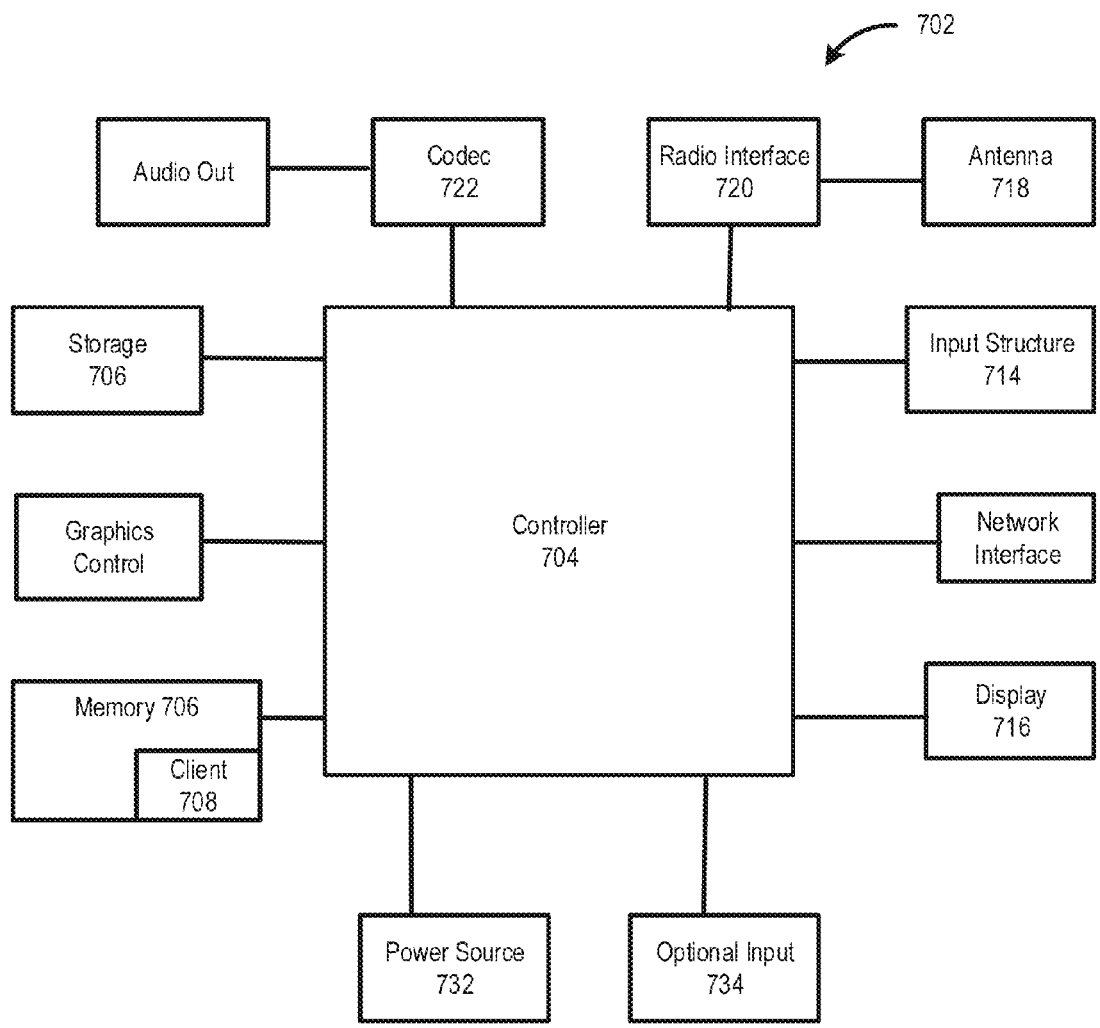
FIG. 7 illustrates a schematic representation of the main components of an example computing platform.

The client-side functionality described above can be implemented as a series of instructions stored on a computer-readable storage medium that, when executed, cause a programmable processor to implement the operations described above. While the client device 110 may be implemented in a variety of different hardware and computing systems, FIG. 7 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touch-screen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone to codec 722 configured to process signals under control of controller 704. Additionally, multipoint sensing devices may be powered power source 732.

Client device 110 may also include one or more user input devices 734 (other than input structure 714) that are operatively coupled to the controller 704. Generally, input devices 734 are configured to transfer data, commands and responses from the outside world into multipoint sensing devices. By way of example, client device 110 may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the client device 110. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. .sctn.101. Herein, reference to a computer-readable storage medium excludes transitory forms of signal transmission (such as a propagating electrical or electromagnetic signal per se) to the extent that they are not eligible for patent protection under 35 U.S.C. . sctn.101.

This disclosure contemplates one or more computer-readable storage media implementing any suitable storage. In some implementations, a computer-readable storage medium implements one or more portions of processor 602 (such as, for example, one or more internal registers or caches), one or more portions of memory 604, one or more portions of storage 606, or a combination of these, where appropriate. In some implementations, a computer-readable storage medium implements RAM or ROM. In some implementations, a computer-readable storage medium implements volatile or persistent memory. In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In some implementations, software includes one or more application programming interfaces (APIs). This disclosure contemplates any suitable software written or otherwise expressed in any suitable programming language or combination of programming languages. In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code). In some implementations, software is expressed in JAVA. In some implementations, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for responding to an online communication comprising:
   receiving a first message at a first computing device wherein the first message is transmitted over a network from a second computing device and displaying a user interface on the first computing device for rating the first message on whether the first message is true or false wherein the first message is an online communications;
   providing a predefined or custom explanation of the rating;
   receiving from an input device at the first computing device the rating of the first message and the explanation of the rating;
   transmitting the rating and the explanation over a network wherein the rating and explanation are received and displayed by the second computing device;
   displaying an online picture of a composer of the first message;
   altering the online picture of the composer of the first message based on the rating;
   wherein the pixels of the online picture are displaced and restored based on the rating.

2. A non-transitory computer readable medium containing instructions that, when executed by a processor on a computing device, cause the computing device to:
   receive a first message wherein the first message was transmitted over a network from a second computing device and display a user interface on the first computing device for rating the first message on whether the first message is true or false wherein the first message is an online communications and providing a predefined or custom explanation of the rating; and
   transmit the rating and the explanation over a network wherein the rating and explanation are received and displayed by the second computing device;
   displaying an online picture of a composer of the first message;
   altering the online picture of the composer of the first message based on the rating;
   wherein the pixels of the online picture are displaced and restored based on the rating.

\* \* \* \* \*